United States Patent
Ma (10) Patent No.: US 10,814,706 B2
(45) Date of Patent: Oct. 27, 2020

(54) HARD TONNEAU COVER WITH MULTI-FIXED POSITION CLAMP ASSEMBLY

(71) Applicant: Winbo-Dongjian Automotive Technology Co. Ltd., Foshan (CN)

(72) Inventor: Yongtao Ma, Foshan (CN)

(73) Assignee: Winbo-Dongjian Automotive Technology Co. Ltd., Foshan (CN)

( * ) Notice: Subject to any disclaimer, the term of this patent is extended or adjusted under 35 U.S.C. 154(b) by 59 days.

(21) Appl. No.: 16/189,292

(22) Filed: Nov. 13, 2018

(65) Prior Publication Data

US 2020/0148046 A1 May 14, 2020

(51) Int. Cl.
- *B60J 7/14* (2006.01)
- *B60J 7/19* (2006.01)
- *B60J 7/16* (2006.01)
- *F16B 2/18* (2006.01)

(52) U.S. Cl.
CPC .............. *B60J 7/198* (2013.01); *B60J 7/141* (2013.01); *B60J 7/1607* (2013.01); *F16B 2/185* (2013.01)

(58) Field of Classification Search
CPC ... B60J 7/14; B60J 7/141; B60J 7/1607; B60J 7/19; B60J 7/198
USPC .......................... 296/100.02, 100.04, 100.07
See application file for complete search history.

(56) References Cited

U.S. PATENT DOCUMENTS

| | | | | |
|---|---|---|---|---|
| 7,188,888 B2 * | 3/2007 | Wheatley | ................. | B60J 7/104 292/256.73 |
| 7,905,536 B2 * | 3/2011 | Yue | .......................... | B60J 7/198 296/100.07 |
| 8,511,736 B2 * | 8/2013 | Williamson | ........... | B60J 7/1607 224/558 |
| 8,632,114 B2 * | 1/2014 | Yue | .......................... | B60J 7/141 296/100.02 |
| 9,533,555 B2 | 1/2017 | Facchinello et al. | | |
| 9,610,831 B2 | 4/2017 | Shi et al. | | |
| 10,232,691 B1 * | 3/2019 | Weng | ......................... | B60J 7/198 |
| 10,315,498 B2 * | 6/2019 | Parkey | ...................... | B60J 7/141 |
| 10,434,855 B1 * | 10/2019 | Ma | ......................... | B60J 7/1607 |
| 2011/0260493 A1 * | 10/2011 | Xu | ............................ | B60J 7/104 296/100.07 |
| 2013/0015678 A1 * | 1/2013 | Williamson | ........... | B60J 7/1607 296/100.09 |

\* cited by examiner

*Primary Examiner* — Jason S Daniels

(74) *Attorney, Agent, or Firm* — Eric J. Sosenko; Jonathan P. O'Brien; Honigman LLP (57) ABSTRACT

A tonneau cover for covering a cargo box of a pickup truck. The tonneau cover includes a cover assembly having at least one panel and a clamp assembly having a clamp base and a clamp. The clamp base is supported by the panel and has portions defining multiple discrete pockets, each of which includes a seat defining a mounting position for the clamp. The clamp including a hanger with a portion shaped to engage the seats. A clamp jaw is freely and slideably mounted on the shank, and a clamp actuator is in fitted engagement with the shank to move the clamp jaw between engaged and disengaged positions. In the disengaged position, the hanger is moveable from the seat of one pocket to the seat of another pocket, and in the engaged position the tonneau cover is retained over the cargo box of the pickup truck.

20 Claims, 8 Drawing Sheets

HARD TONNEAU COVER WITH MULTI-FIXED POSITION CLAMP ASSEMBLY

BACKGROUND

1. Field of the Invention

The present invention generally relates to tonneau covers. More specifically, the invention relates to a clamp assembly for selectively securing a tonneau cover to the bed or cargo box of a pickup truck.

2. Description of Related Art

Tonneau covers for covering the cargo boxes, also referred to as a bed, of pickup trucks are well known for protecting the contents in the cargo box from environmental factors, shielding such contents from view and/or for enhancing the aesthetics of the pickup truck. Generally, tonneau covers are movable so as to selectively close off or provide access to the cargo box, without requiring complete removal of the tonneau cover. In this regard, the tonneau covers are typically of a roll-up variety, a tilting variety or a folding variety.

Regarding the tiltable and foldable varieties of tonneau covers, the varieties typically include a frame disposed about the upper surfaces of the side and end bed rails of the cargo box with transverse bows extending between the side rails. If of the foldable variety, one or more hinged connections are provided in the frame to allow the tonneau cover to progressively fold upon itself in a direction typically proceeding from the tailgate toward the cab of the pickup truck.

To cover the open areas between the various frame members of the tonneau cover, the tonneau cover may be provided with a flexible cover extending over the frame. This is generally known as a soft-top tonneau cover. Alternatively, the tonneau cover may be provided with one or more rigid panels between the frame members. This is often referred to as a hardtop tonneau cover. In either instance, a clamp assembly is typically located toward the rear of the tonneau cover (generally adjacent to the tailgate of the pickup truck). This clamp assembly provides quick and easy engagement and disengagement of the rear section of the tonneau cover with and from the cargo box, thereby allowing the tonneau cover to be folded or secured over the cargo box.

While many clamp assemblies work for the purposes of securing the tonneau cover and allowing it to be folded, certain clamp assemblies allow the user to discretionarily position the clamp assembly laterally with respect to the side wall of the pickup truck bed. This can result in the clamp assembly being misaligned, too far away from or too close to the bed side wall. This may also allow the tonneau cover to shift from side to side on the cargo bed after latching. Accordingly, there is always a need to improve upon the functionality and workability of the clamp assembly.

SUMMARY

In satisfying the above need, as well as overcoming various drawbacks and other limitations of the related art, the present invention provides a tonneau cover for covering the cargo box of a pickup truck.

In an aspect of the invention, a tonneau cover for covering a cargo box of a pickup truck is provided. The tonneau cover includes a cover assembly and two or more clamp assemblies. The cover assembly is configured to cover the cargo box and includes at least one rigid panel. The clamp assembly includes a clamp base supported by the panel and a clamp that selectively and removably engages with the clamp base in one of a plurality of discrete pockets. Each of pockets has an inlet on a lower surface of the clamp base and a seat defined internally of the clamp base. The clamp including a hanger, a clamp jaw and a clamp actuator. The hanger has an end shaped to engage the seats of the pockets and a shank on which the clamp jaw is freely and slideably mounted. The clamp actuator is in fitted engagement with the shank and is operable to move the clamp jaw between engaged and disengaged positions. In the disengaged position, the head of the hanger is moveable from the seat of one pocket to the seat of another pocket, and in the engaged position clamp jaw, hanger and clamp base cooperate to retain the tonneau cover over the cargo box of the pickup truck.

In another aspect, the pockets are L-shaped pockets.

In a further aspect, the L-shaped pockets having a first end extending perpendicular or generally perpendicular to the panel and a second leg extending parallel or generally parallel to the panel, portions of the second leg defining the seat.

In an additional aspect, the pockets are defined by a ledge protruding from a side wall of the clamp base.

In yet another aspect, the pocket is defined by a pair of opposed ledges protruding from opposed side walls of the clamp base.

In a further aspect, the opposed ledges are connected by an intermediary wall separating one pocket from an adjacent pocket.

In still a further aspect, the seat is a concave surface.

In an additional aspect, the seat is a cylindrical concave surface.

In still another aspect, the head of the hanger is cylindrical.

In yet an additional aspect, the hanger is a T-bolt.

In a further aspect, the clamp base is mounted in a channel provided in the panel.

In another aspect, clamp base is at least partially recessed within the channel.

In an additional aspect, the seat is recessed with in the channel.

In still a further aspect, the clamp actuator is pivotally and rotatably engaged with the shank.

In another aspect, clamp actuator is a clamp handle threadably engaged with the shank.

Yet in an additional aspect, the clamp handle includes a portion defining a cam surface contacting the clamp jaw and operable to move the clamp jaw along the support bar during pivoting of the clamp handle relative to the support bar.

In a further aspect, clamp actuator is a clamp knob threadably engaged with the shank.

In an additional aspect, panel includes storage compartment configured to stow the clamp when disengaged from the clamp base.

In yet another aspect, the storage compartment include a channel, an enclosed space at an end of the channel, and a retainer clip engaged in and supported by the channel.

Still a further aspect, the retainer engages one of the clamp actuator and the shank.

Further objects, features and advantages of this invention will become readily apparent to persons skilled in the art after review of the description provided herein with reference to the drawings and claims that are appended to and form a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an access is designated in the figures. An axial surface is one that faces in the axial direction. In other words, an axial surface faces in a direction along the central axis. A radial surface therefore faces radially, either away from or toward the central axis. It will be understood, however, that in actual implementation, the directional references used herein may not necessarily correspond with the installation and orientation of the corresponding components or device.

Figure 1:
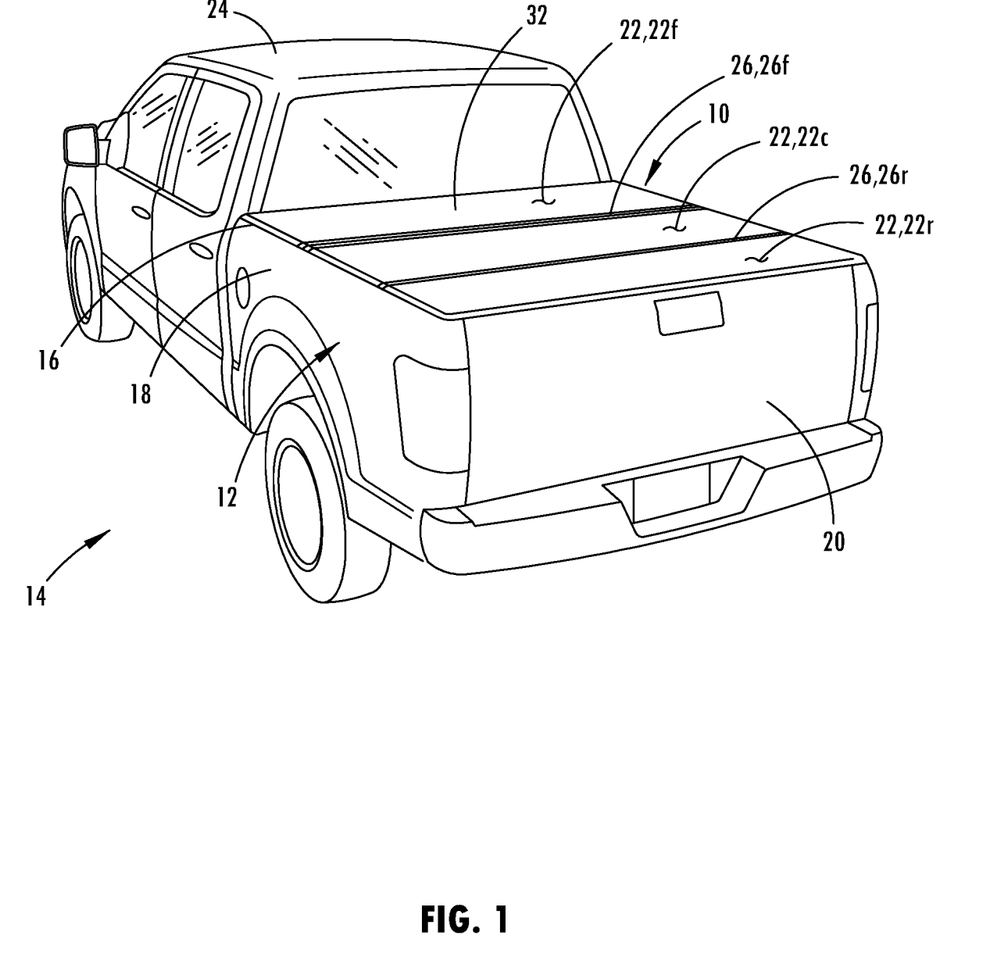
FIG. 1 is a perspective view of a pickup truck with a tonneau cover positioned over the cargo box of the pickup truck.

Referring now to the drawings, shown in FIG. 1, and designated at 10, is a tonneau cover disposed over the cargo box/bed 12 of a pickup truck 14. The tonneau cover 10 is supported over the cargo box 12 on the upper face 16 of the various walls defining the cargo box 12. Those walls include the bed sidewalls 18, the bed front wall (not shown) and the tailgate 20.

While the tonneau cover 10 may be of the tilting variety mentioned above, for the purposes of the following discussion, but not intended to be limited thereby, the various aspects and features embodying the principles of the present invention will be described in the context of a folding, hard-top tonneau cover.

The tonneau cover 10, as seen in FIG. 1, is unfolded and in its fully extended position. In this position, it will be appreciated that the tonneau cover 10 substantially covers the upper opening into the cargo box 12. In a tri-fold embodiment, the tonneau cover 10 is comprised of three rigid panels 22 that are foldable over one another so as to selectively uncover some or all of the cargo box 12. In the folded position, a rear or tailgate panel 22r (located closest to the tailgate 20 in the unfolded position) is folded onto a center or middle panel 22c, and then both of the rear and center panels 22r, 22c are folded together onto the front cab-end panel 22f (located closest to a cab 24 of the pickup 14 in the unfolded and folded positions). Each panel 22 is connected to an adjacent panel 22 by a hinge 26, which include a front hinge 26f and a rear hinge 26r in a tri-fold construction. Since the folding aspect of the tonneau cover 10 is not the particular focus hereof, the hinges 26 and the folded positions of the tonneau cover 10 are not illustrated in connection with the present description. Notwithstanding the above, and in the interest of completeness, general aspects of the tonneau cover 10, and its ability to fold, are variously discussed herein.

Generally, each panel 22 is bounded on its lateral sides by side frame members 28 that, in the open position, overlie the upper face 16 of the bed sidewalls 18. At their front and rear ends, the panels 22 are bounded by front and rear frame member (not shown). In the rear panel 22r, the rear frame member overlies the tailgate 20 and the front frame member forms a part of the rear hinge 23r. In the center panel 22c, the rear frame member forms part of the rear hinge 23r and the front frame member forms part of the front hinge 23f. In the front panel 22f, the rear frame member forms part of the front hinge 23f and the front frame member overlies the upper face of the front bed wall.

At the corner intersections of the front, side and rear frame members, corner members interconnect the frame members to one another. Such corner members are well known and therefore need not be further discussed herein.

As previously mentioned, the panels 22 are rigid structures and, accordingly, may be formed in a variety of techniques that are well known to those skilled in this present field. For example, the panels 22 may be constructed with solid upper and lower skins or sheets 30, 32 of aluminum, stainless steel or other material. Between the skins 30, 32 may be provided a core 34 formed of an extruded polystyrene foam sheet, honeycomb or other material. Since the particular construction of the panels 22 will vary based on the individual preferences of the manufacturer and the particular design criteria for the tonneau cover, further details regarding the specific construction of the panels 22 themselves is not provided.

Preferably, the tonneau cover 10 includes two sets of latch or clamp assemblies, a pair of rear clamp assemblies 36 associated with the rear panel 22r and a pair of front clamp assemblies 38 associated with the front panel 22f. The front clamp assemblies 38 may be of the same or similar construction as that of the rear clamp assemblies 36 or of a completely different construction. Generally, however, the rear clamp assemblies 36 require a greater ease of operation since these assemblies must be disconnected in order for the tonneau cover 10 to be folded. The front clamp assemblies 101 (seen in FIGS. 8 and 9), once installed, can remain installed until the tonneau cover 10 needs to be completely removed, unless, of course, the tonneau cover 10 is designed such that the front portion 22f can be folded rearward. In that latter case, the front clamp assemblies 101 also need to be readily and easily engaged and disengaged.

Figure 2:
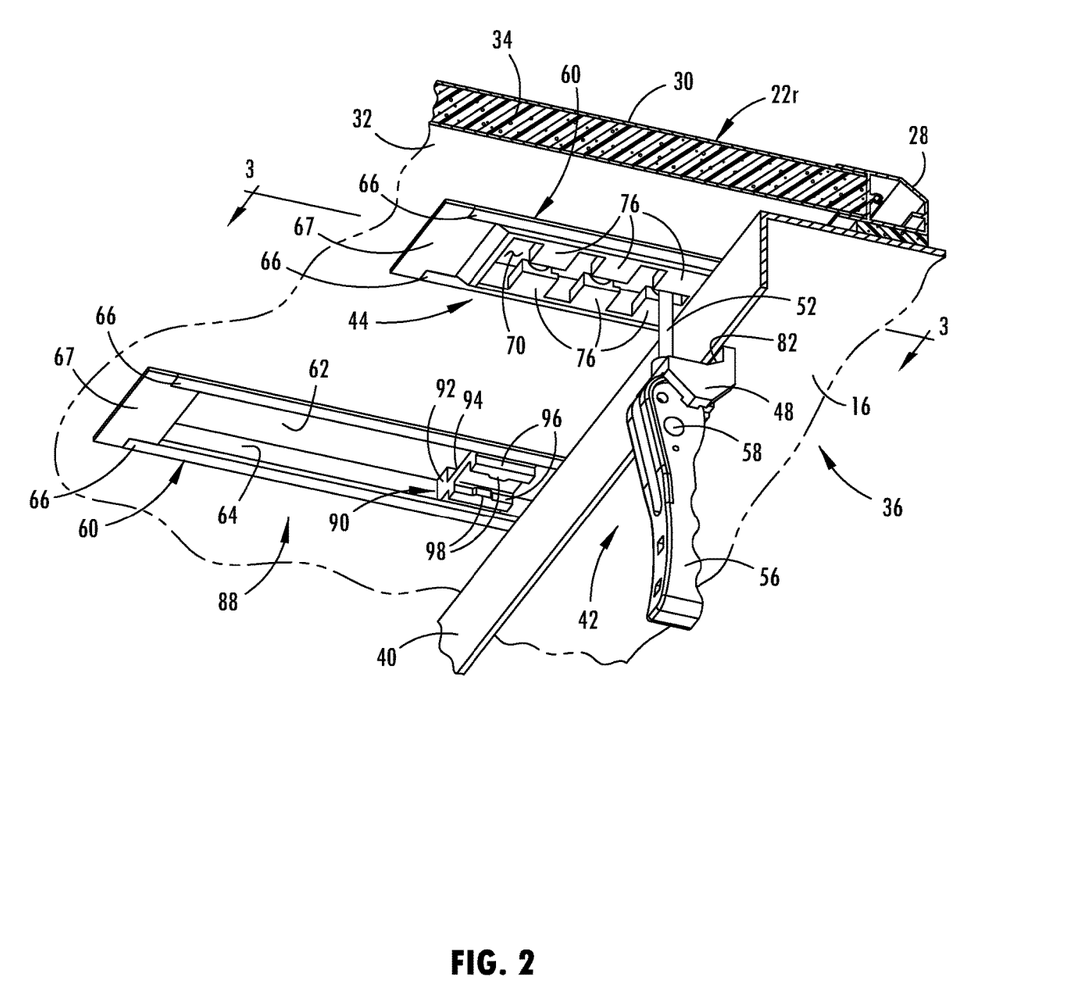
FIG. 2 is perspective view of a clamp assembly of the tonneau cover seen in FIG. 1, with the clamp assembly in a first, latched in-use position.

Referring now to FIG. 2, one of a pair of rear clamp assemblies 36 is illustrated therein in a use and clamped position on the right side of the tonneau cover 10. The other of the pair is located in an opposed position on the left side of the tonneau cover 10. In the use position, the clamp assembly 36 generally extends into the cargo box 12. In the clamped position, the clamp assembly 36 engages a downwardly extending inner flange 40 of the bed side wall 18 so as to secure the tonneau cover 10 over the cargo box 12 of the pickup truck 14. The force applied to the flange 40 by the clamp assembly 36 pulls the remaining portions of the tonneau cover 10 downward, toward the upper face 16 of the bed sidewall 18, thereby rigidly securing the tonneau cover 10 to the pickup truck 14.

As seen therein, the rear clamp assembly 36 includes a clamp 42 that is moveable between discreet clamping positions in a clamp base 44. In the illustrated construction, there are three clamping positions, but it will be understood that the clamp base 44 may include a different number of clamp positions. As used herein, discreet clamping positions means that the clamp 42 must be removed from the clamp base 44 in order to be moved from one discreet position to another. This is in contrast to a construction where a clamp may be slid between multiple clamp positions.

Preferably, the clamp 36 includes hanger in the form of a T-bolt 46 upon which a clamp jaw 48 is supported and freely movable, both in translation and rotation. The T-bolt 46 further includes a head 50 from which extends a shank 52, the latter of which is provided with threads 54 at its distal end. Beyond the clamp jaw 48, a clamp actuator or handle 56 is mounted to the shank 52 of the T-bolt 46. The mounting of the clamp handle 56 to the shank 52 is such that the clamp handle 56 is both rotatable and pivotable relative to the shank 52. In mounting the clamp handle 56 to the shank 52, a fitted engagement is employed, meaning that the clamp handle 56 can be moved along the shank 52 upon a specific movement, but is not freely slideable along the shank 52. In providing the fitted engagement, a pivot pin 58 extends through the clamp handle 56 perpendicular to the shank 52. Transverse to the axis of the pivot pin 58, the pivot pin 58 is provided with an internally threaded bore that correspondingly engages the threads 54 on the distal end of the shank 52. Accordingly, by rotating the clamp handle 56, and therefore the pivot pin 58, the position of the clamp handle 56 and the clamp jaw 48 can be varied and adjusted along the shank 52 of the T-bolt 46.

Figures 3, 4:
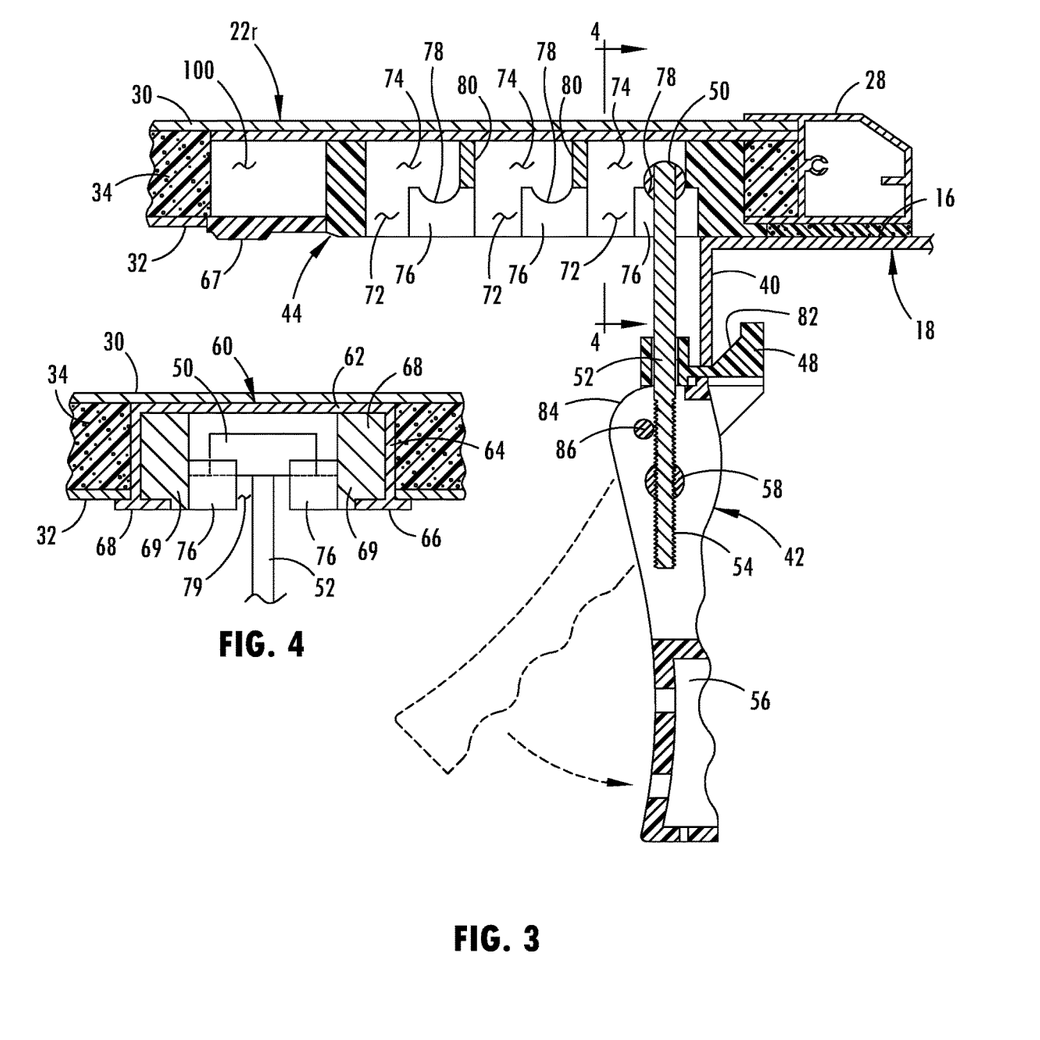
FIG. 3 is sectional view, generally taken along line 3-3 in FIG. 2, of the clamp assembly in the latched in-use position.
FIG. 4 is a sectional view, generally taken along line 4-4 in FIG. 3, of the clamp assembly in the latched in-use position.

The clamp base 44 is mounted within a channel 60 provided in the panel 22 and is therefore supported by the panel 22. The channel 60 is a structural channel integrally attached to the panel 22, by means such as adhesive, and includes a channel upper wall 62 adjacent to the upper skin 30 and opposed channel side walls 64 with inwardly directed flanges 66. As seen in FIG. 4, when the clamp base 44 is received within the channel 60, extensions 68 of the base side walls 69 rest upon the flanges 66 and are cooperatively retained therein by the flanges 66, channel side walls 64 and channel upper wall 62. Mounted to the end of the channel 60 is an end cap 67, which is further discussed below.

As previously mentioned, the head 50 of the T-bolt 46 can be received in multiple discreet clamping positions. The clamping positions are defined in the clamp base 44 by inverted L-shaped pockets 70, as readily seen FIG. 3. The L-shaped pockets 70 each include a first leg 72 that extends into the clamp base 44, toward the upper skin 30, perpendicular to the plane defined by the rear panel 22r. The first leg 72 may extend at other angles that are not truly perpendicular to the upper skin. Such angles, herein referred to as generally perpendicular, are preferable less than 90° but more than 45°. An angle at or close to 90° is preferred in that it allows for a more compact construction of the clamp base 44 and shortens the length of the first leg 72. A second leg 74 of the L-shaped pockets 70 extends transversely from the first leg 72, parallel or generally to the plane of the rear panel 22r.

As seen in FIG. 3, the upper side of the second leg 74 and the interior end of the first leg 72 may be defined by the upper wall of the channel 60. Alternatively, the upper side of the second leg 74 and the interior end of the first leg 72 may be defined by an upper wall (not shown) of the clamp base 44 located adjacent to the upper wall 62 of the channel 60. The lower side of the second leg 74 is defined by the upper surfaces of a pair of spaced apart, opposed shelves 76 protruding from the base side walls 69. Notably, these upper surfaces are concave surfaces that operate to define a seat 78 for receiving the head 50 (which is cylindrically shaped) of the T-bolt 46 in each of the mounting positions, with the shank 52 extending through the open space 79 between the opposed shelves 76. Defining the end of the second leg 74, and separating each mounting position from the adjacent mounting position, is a transverse intermediate wall 80 that extends between the base side walls 69 and joins the shelves 76 together.

Figure 5:
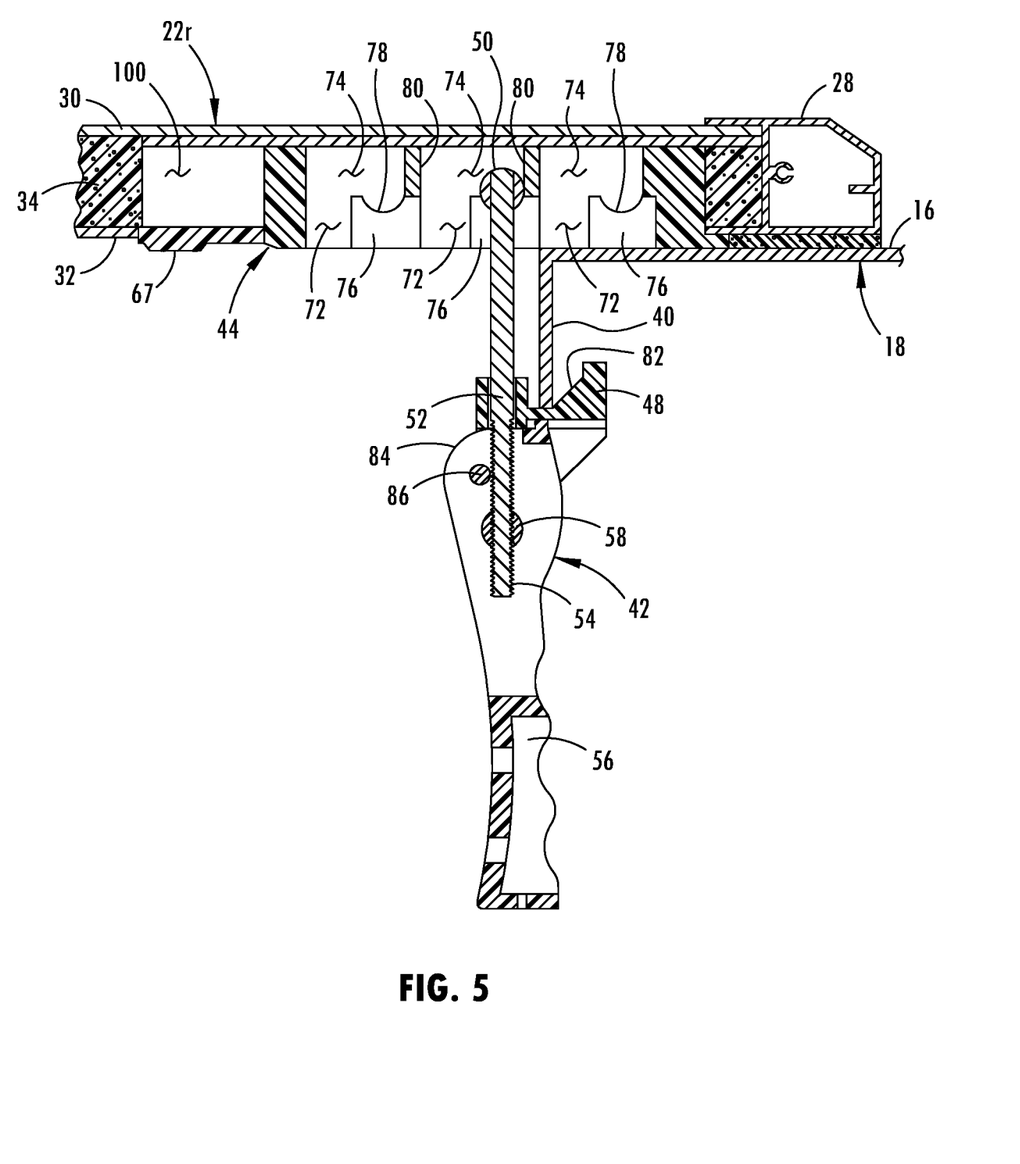
FIG. 5 is sectional view, similar to that of FIG. 3, illustrating the clamp assembly in an unlatched position.

The various mounting positions defined by the seats 78 of the clamp base 44 enable the tonneau cover 10 to accommodate pickup trucks 14 having upper surfaces 16 of the bed side walls 18 of different widths. As seen in FIG. 3, the width of the upper surface 16 of the bed side wall 18 is relatively narrow and the clamp 42 is received in the outermost mounting position. In contrast, and as seen in FIG. 5, the width of the upper surface 16 of the bed side wall 18 is relatively wide and the clamp 42 is received in the middle mounting position. If the upper surface 16 of the bed side wall 18 were even wider, the clamp 42 could be received in the innermost mounting position to accommodate that pickup truck 14.

With the clamp jaw 48 adjusted along the shank 52 of the T-bolt 46 to a position where the inner flange 40 is received within a crotch 82 of the clamp jaw 48, the clamp handle 56 can be rotated downward, as indicated in FIG. 3, into the latched position where the clamp handle 56 is aligned with the shank 52. The clamp handle 56 includes a cam surface 84 adjacent to the clamp jaw 48, and upon movement of the clamp handle 56 into the latched position, the cam surface 84 is configured to move the clamp jaw 48 upward along the shank 52 towards the panel 22r, captively retaining the inner flange 40 within the crotch 82 and thereby securing the tonneau cover 10 to the bed sidewall 18. Movement of the clamp assembly 36 from the latched position to the unlatched position is done in reverse.

If desired, the clamp 42 may be provided with a lock pin 86. In the latched position, the lock pin 86 may be inserted into a bore through the clamp handle 56. In this position, the lock pin 86 interferes with the shank 52 and prevents the clamp handle 56 from being rotated from the latched position to the unlatched position.

Figure 6:
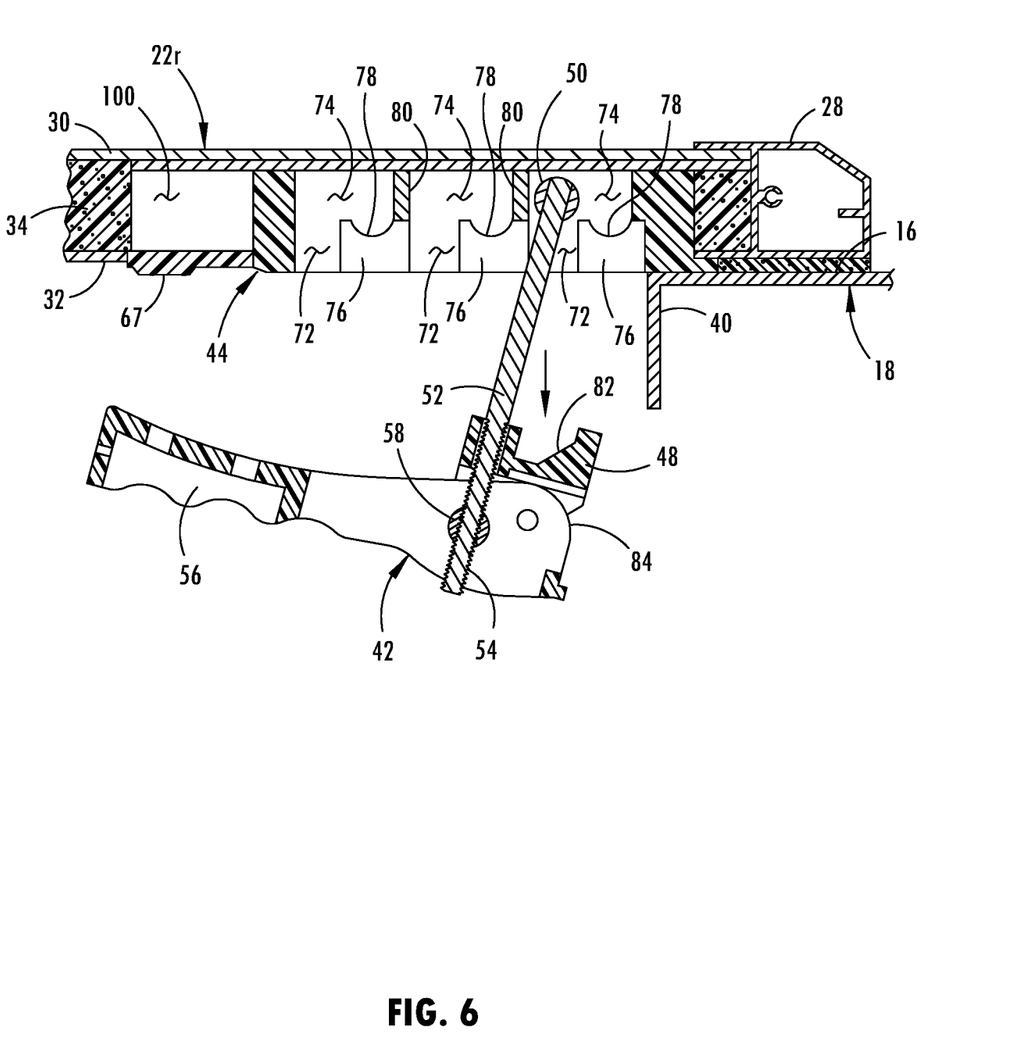
FIG. 6 is sectional view, similar to that of FIG. 3, illustrating the clamp assembly in a second, latched in-use position.

As discussed above, rotation of the clamp handle 56 toward the panel 22r unlatches the clamp assembly 36 from the side wall 18 of the pickup truck 14. In the unlatched position, seen in FIG. 6, the head 50 of the T-bolt 46 can be moved out of the seat 78 and along the second leg 74 of the pocket 70. Upon reaching the first leg 72 of the pocket 70, the head 50 can be moved downward along the first leg 72, out of the pocket 70 and disengaged from the clamp base 44. Once disengaged from the clamp base 44, the clamp 42 may be stored in a storage compartment 88 of the panel 22r.

As seen in FIG. 2, the storage compartment 88 is formed by utilizing a channel 60 as previously described. However, instead of the clamp base 44, provided in the channel 60 is a retainer clip 90. The retainer clip 90 includes side extensions 92 connected by a bridge 94. The side extensions are supported on the flanges 66 and cooperatively retained between the flanges 66, the channel side wall 64 and the channel upper wall 62. The side extension 92 may be sized such that the position of the retainer clip 90 is slideably adjustable within the channel 60. On its lower surface, the bridge 94 is further provided with spaced apart resilient arms 96 having inward protrusions 98 on the ends thereof, which are seen in FIG. 2.

Figure 7:
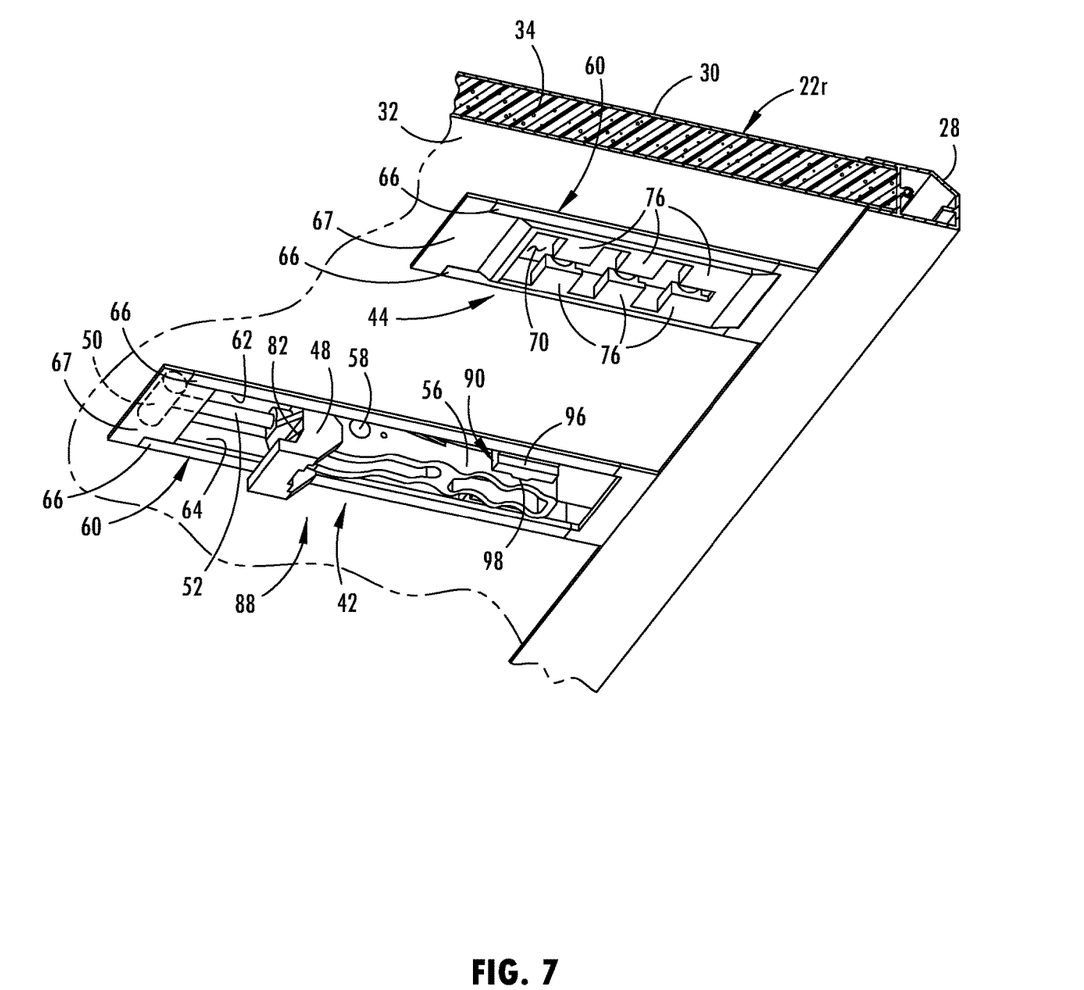
FIG. 7 is a perspective view of the clamp assembly in stored, nonuse position.

As previously mentioned, an end cap 67 is provided on the end of the channel 60. The end cap 67 cooperates with the channel 60 to define an enclosed end space 100 that is used in connection with storage of the clamp 42. As seen in FIG. 7, when not being used for retaining the tonneau cover 10 over the cargo box 12 of the pickup truck 14, such as when the panels 22 of the tonneau cover 10 are folded upon one another or when the tonneau cover 10 is removed from the pickup truck 14, the clamp 42 is stowed in the storage compartment 88. This is achieved by inserting the head 50 of the T-bolt 46 into the end space 100 formed by the end cap 67 and channel 60 and then engaging the clamp handle 56 between the arms 96 of the retainer clip 90, where it is retained by a press-fit or friction engagement with the protrusions 98.

Figure 8:
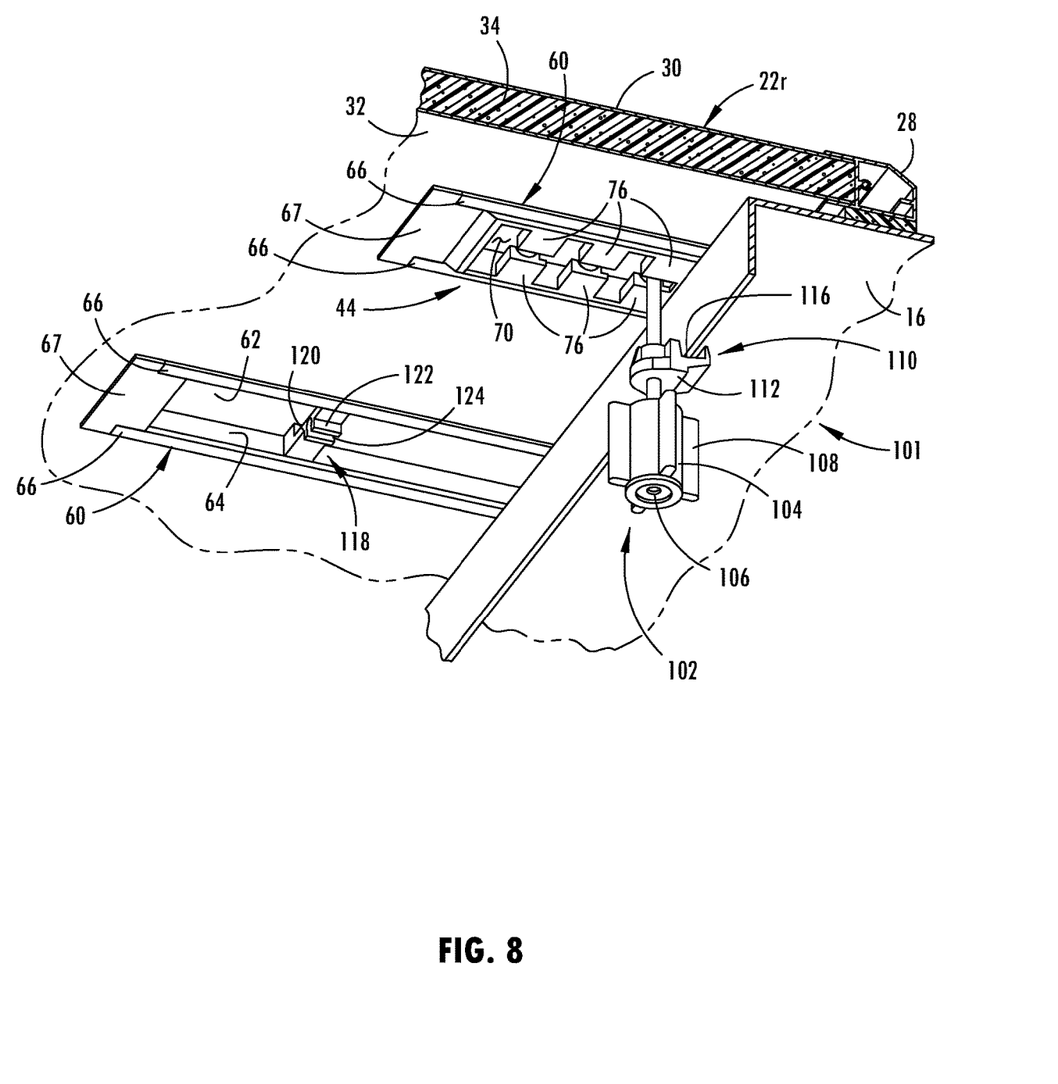
FIG. 8 is perspective view of an alternate clamp assembly in the latched in-use position.
Figure 9:
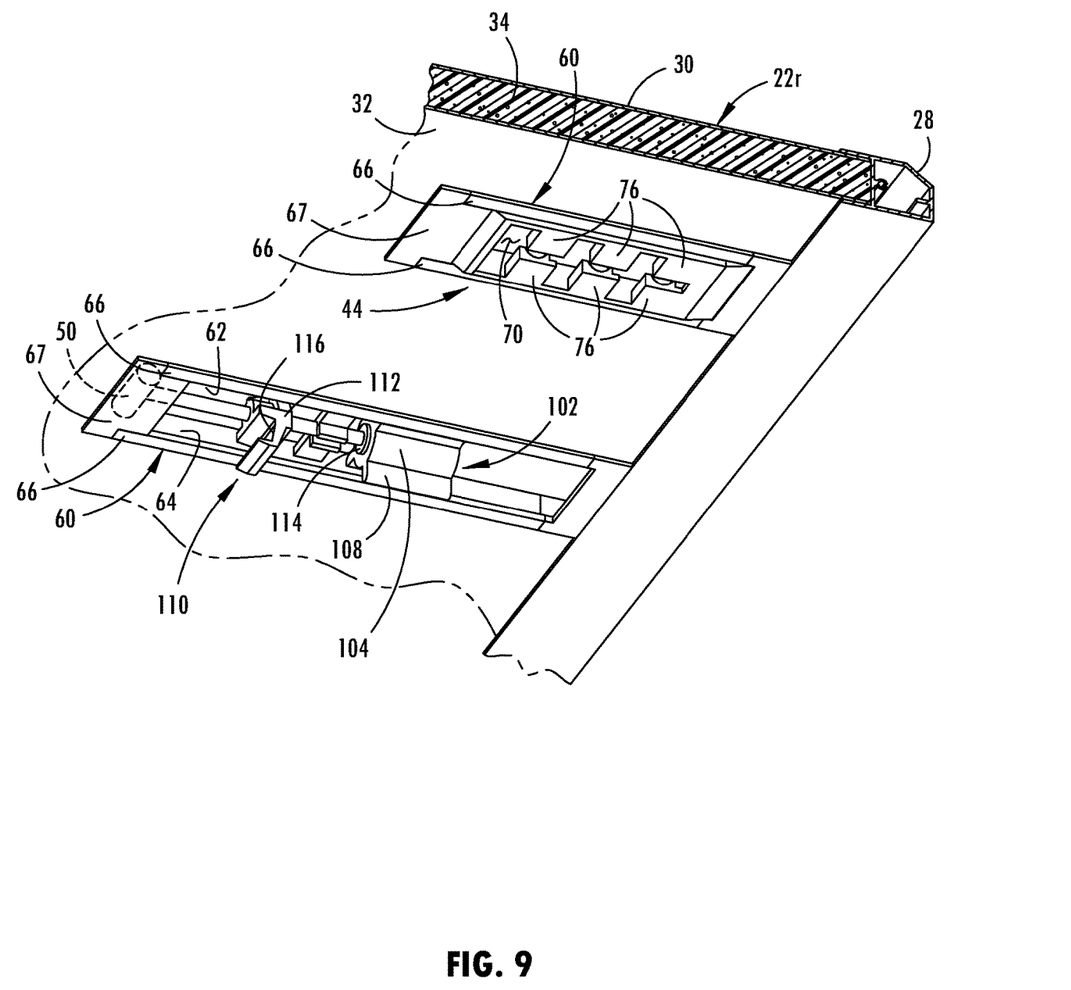
FIG. 9 is a perspective view of the clamp assembly of FIG. 8 in a stored, nonuse position.

Illustrated in FIGS. 8 and 9 is the front clamp assembly 38. The front clamp assembly 38 utilizes a substantial number of components in common with the rear clamp assembly 36. Accordingly, only the differences of the rear clamp assembly 38 are discussed herewith, reference being had to the previous description for details of the channel 60, the end cap 67 the clamp base 44 and the T-bolt 46.

As seen in FIGS. 8 and 9, the clamp 101 of the front clamp assembly 38 replaces the clamp handle 56 of the rear clamp assembly 36 with a clamp actuator in the form of a knob 102. The clamp knob 102 is provided as a generally cylindrical body 104 having a central bore 106 that is internally threaded for fitted engagement with the threads 54 on the distal end of the shank 52. The exterior of the body 104 may be provided with griping features, such as radial extensions 108, to aid in rotating the clamp knob 102.

A clamp jaw 110 is similarly slideably received on the shank 52 of the T-bolt 46. The lower surface of the clamp jaw 110, however, is formed as a flat face 112 to engage with a similarly top flat face 114 on the clamp knob 102.

With the head 50 engaged in one of the seats 78 of the mounting positions, by rotating the clamp knob 102, the knob 102 is configured to move a clamp jaw 110 upward along the shank 52 towards the panel 22r, captively retaining the inner flange 40 within a crotch 116 of the clamp jaw 101 and thereby securing the tonneau cover 10 to the bed sidewall 18 in the latched position of the front clamp assembly 101. The unlatched position is achieved by rotating the clamp knob 102 in an opposite direction and disengaging the crotch 116 of the clamp jaw 110 from the inner flange 40.

Storage of the clamp 101 similarly includes positioning the head 50 of the T-bolt 46 in the enclosed space 100 defined by the end cap 67 and the channel 60, and then securing the clamp with a retainer clip 118. Instead of the arms 96 and protrusions 98 utilized with the rear clamp assembly 36, the retainer clip 118 includes a bridge 120 having arms 122 that define cylindrical or C-shaped receiving channel 124. The receiving channel 124 is shaped and sized to captively receive the shank 52 therein. Thus, the arms 122 are resilient enough to spread apart as the shank 52 is pushed into the receiving channel 124 and thereafter wrap around and retain the shank 52 within the receiving channel 124 in a stowed position. The retainer clip 118 similarly includes side extension 92 allowing the clip 118 to be slideable within the channel 60.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tonneau cover for covering a cargo box of a pickup truck, the tonneau cover comprising:
   a cover assembly configured to cover the cargo box and including at least one rigid panel; and
   a clamp assembly including a clamp base and a clamp, wherein
   the clamp base being supported by the panel of the cover assembly and having portions defining a plurality of discrete L-shaped pockets, each of pockets having an inlet on a lower surface of the clamp base and a seat defined internally of the clamp base;
   the clamp including a hanger, a clamp jaw and a clamp actuator, the hanger having a head on an end of a shank, the head being correspondingly shaped to engage the seats of the pockets, the clamp jaw being freely and slideably mounted on the shank, and the clamp actuator being in fitted engagement with the shank and being operable to move the clamp jaw between engaged and disengaged positions; and
   whereby in the disengaged position, the head of the hanger being moveable from the seat of one pocket to the seat of another pocket and in the engaged position the hanger being engaged with the seat of one of the pockets and cooperating with the clamp jaw and the clamp base to retain the tonneau cover over the cargo box of the pickup truck.

2. The tonneau cover according to claim 1, wherein the L-shaped pockets having a first end extending perpendicular or generally perpendicular to the panel and a second leg extending parallel or generally parallel to the panel, portions of the second leg defining the seat.

3. The tonneau cover according to claim 1, wherein the pocket is defined by a ledge protruding from a side wall of the clamp base.

4. The tonneau cover according to claim 1, wherein the pocket is defined by a pair of opposed ledges protruding from opposed side walls of the clamp base.

5. The tonneau cover according to claim 4, wherein the opposed ledges are connected by an intermediary wall separating one pocket from an adjacent pocket.

6. The tonneau cover according to claim 1, wherein the seat is a concave surface.

7. The tonneau cover according to claim 1, wherein the seat is a cylindrical concave surface.

8. The tonneau cover according to claim 7, wherein the head of the hanger is cylindrical.

9. The tonneau cover according to claim 8, wherein hanger is a T-bolt.

10. The tonneau cover according to claim 1, wherein the clamp base is mounted in a channel provided in the panel.

11. The tonneau cover according to claim 10, wherein clamp base is at least partially recessed within the channel.

12. The tonneau cover according to claim 11, wherein the seat is recessed within the channel.

13. The tonneau cover according to claim 1, wherein the clamp actuator is pivotally and rotatably engaged with the shank.

14. The tonneau cover according to claim 13, wherein clamp actuator is a clamp handle threadably engaged with the shank.

15. The tonneau cover according to claim 14, wherein the clamp handle includes a portion defining a cam surface contacting the clamp jaw and operable to move the clamp jaw along the support bar during pivoting of the clamp handle relative to the support bar.

16. The tonneau cover according to claim 1, wherein clamp actuator is a clamp knob threadably engaged with the shank.

17. A tonneau cover for covering a cargo box of a pickup truck, the tonneau cover comprising:
   a cover assembly configured to cover the cargo box and including at least one rigid panel; and
   a clamp assembly including a clamp base and a clamp, wherein
      the clamp base being supported by the panel of the cover assembly and having portions defining a plurality of discrete L-shaped pockets, each of pockets having an inlet on a lower surface of the clamp base and a seat defined internally of the clamp base;
      the clamp including a hanger, a clamp jaw and a clamp actuator, the hanger having a head on an end of a shank, the head being correspondingly shaped to engage the seats of the pockets, the clamp jaw being freely and slideably mounted on the shank, and the clamp actuator being in fitted engagement with the shank and being operable to move the clamp jaw between engaged and disengaged positions; and
   whereby in the disengaged position, the head of the hanger being moveable from the seat of one pocket to the seat of another pocket and in the engaged position the hanger being engaged with the seat of one of the pockets and cooperating with the clamp jaw and the clamp base to retain the tonneau cover over the cargo box of the pickup truck; and
   the panel including a storage compartment separate and distinct from the clamp base and configured to stow the clamp when disengaged from the clamp base.

18. The tonneau cover according to claim 17, wherein the storage compartment include a channel, an enclosed space at an end of the channel, and a retainer clip being engaged in and supported by the channel.

19. The tonneau cover according to claim 18, wherein the retainer clip engages one of the clamp actuator and the shank.

20. A tonneau cover for covering a cargo box of a pickup truck, the tonneau cover comprising:
   a cover assembly configured to cover the cargo box and including at least one rigid panel; and
   a clamp assembly including a clamp base and a clamp, wherein
      the clamp base being supported by the panel of the cover assembly and having portions defining a plurality of seats defined internally of the clamp base;
      the clamp including a hanger, a clamp jaw and a clamp actuator, the hanger having a head on an end of a shank, the head being correspondingly shaped to engage the seats, the clamp jaw being freely and slideably mounted on the shank, and the clamp actuator being in fitted engagement with the shank and being operable to move the clamp jaw between engaged and disengaged positions; and
   whereby in the disengaged position, the head of the hanger being moveable from a first one of the seats to a second one of the seats, and in the engaged position the hanger being engaged with one of the plurality of seats and cooperating with the clamp jaw and the clamp base to retain the tonneau cover over the cargo box of the pickup truck; and
   the panel including a storage compartment separate and distinct from the clamp base and configured to stow the clamp when disengaged from the clamp base.

\* \* \* \* \*